US008500430B2

(12) United States Patent
Herault (10) Patent No.: US 8,500,430 B2
(45) Date of Patent: Aug. 6, 2013

(54) VULCANIZING PRESS

(75) Inventor: Stéphane Herault, Clermont-Ferrand (FR)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 13/503,088

(22) PCT Filed: Oct. 20, 2010

(86) PCT No.: PCT/EP2010/065779
§ 371 (c)(1),
(2), (4) Date: May 11, 2012

(87) PCT Pub. No.: WO2011/048131
PCT Pub. Date: Apr. 28, 2011

(65) Prior Publication Data
US 2012/0231101 A1    Sep. 13, 2012

(30) Foreign Application Priority Data
Oct. 20, 2009 (FR) .................................... 09 57362

(51) Int. Cl.
*B29C 33/30* (2006.01)
(52) U.S. Cl.
USPC ............... 425/28.1; 425/40; 425/47; 425/195
(58) Field of Classification Search
USPC ................................ 425/28.1, 35, 40, 47, 195
See application file for complete search history.

(56) References Cited

U.S. PATENT DOCUMENTS

| 4,580,959 | A |   | 4/1986  | Pizzorno et al.            |
|-----------|---|---|---------|----------------------------|
| 4,601,648 | A | * | 7/1986  | Amano et al. ......... 425/47  |
| 4,883,415 | A | * | 11/1989 | Salvadori ............. 425/195 |
| 4,964,792 | A | * | 10/1990 | Katayama et al. ...... 425/195 |

(Continued)

FOREIGN PATENT DOCUMENTS

| DE | 2009 012 191 A1 | 9/2009  |
|----|-----------------|---------|
| EP | 0 520 253 A2    | 12/1992 |
| EP | 1 637 304 A1    | 3/2006  |
| FR | 1 570 554       | 6/1969  |

OTHER PUBLICATIONS

International Search Report (PCT/ISA/210) issued on Feb. 7, 2011, by European Patent Office as the International Searching Authority for International Application No. PCT/EP2010/065779.

*Primary Examiner* — James Mackey
(74) *Attorney, Agent, or Firm* — Buchanan Ingersoll & Rooney PC (57) ABSTRACT

The invention relates to a vulcanizing press comprising two plates capable of adopting a proximal position in which said plates close a mold, so as to give a tire a predetermined shape, and a distal position in which the mold is open; and at least one bore formed in one of said plates called the support plate, the diameter of said bore being defined so as to let the head of a pin pass thereinto. The vulcanizing press further includes a locking/unlocking device comprising a first movable stop that can move between a rest position and an active position, in which said stop is interposed between the head of the pin and the support plate in order to keep said pin in the bore, the shank of said pin being fixed to the mold.

7 Claims, 5 Drawing Sheets

U.S. PATENT DOCUMENTS

| | | | |
|---|---|---|---|
| 5,259,742 A * | 11/1993 | Ichikawa et al. | 425/195 |
| 5,271,727 A * | 12/1993 | Irie | 425/40 |
| 5,820,886 A * | 10/1998 | Irie | 425/47 |
| 5,863,484 A | 1/1999 | Hasegawa et al. | |
| 2007/0009624 A1 | 1/2007 | Ichimaru | |
| 2011/0086123 A1 * | 4/2011 | Bahlke | 425/195 |

* cited by examiner

VULCANIZING PRESS

BACKGROUND

1. Field

Disclosed herein is a vulcanizing press for manufacturing a tire and a system for manufacturing a tire using such a vulcanizing press.

2. Description of Related Art

Document FR 1 570 554 discloses a vulcanizing press comprising a top plate and a bottom plate.

A mold, placed between the top plate and the bottom plate, enables a tire to be given a predetermined shape. More particularly, the top plate and the bottom plate are capable of adopting a proximal position in which said plates close the mold, in order to give the tire the predetermined shape, and a distal position in which the mold is closed.

As is known, the mold comprises an upper part and a lower part that are fixed to the top plate and to the bottom plate, respectively, using a set of pins and nuts.

To be able to form various types of tire having various characteristics (size, tread pattern, etc.) with the same vulcanizing press, it is possible to change mold by unclamping the various nuts and loading a new mold on the fixed plate. Such a mold-changing operation is often lengthy and irksome, since it is necessary for the nuts to be slackened and tightened manually. This operation is all the more tricky as sometimes the nuts are awkward to access for an operator.

There is therefore a need to optimize the time required to change a mold on a vulcanizing press for manufacturing tires.

SUMMARY

Disclosed herein is a vulcanizing press comprising two plates capable of adopting a proximal position in which said plates close a mold, so as to give a tire a predetermined shape, and a distal position in which the mold is open; at least one bore being formed in one of said plates called the support plate, the diameter of said bore being defined so as to let the head of a pin pass thereinto. The vulcanizing press further includes a locking/unlocking device comprising a first movable stop that can move between a rest position and an active position, in which said stop is interposed between the head of the pin and the support plate in order to keep said pin in the bore, the shank of said pin being fixed to the mold.

If the support plate is the top plate, the upper part of the mold is rapidly fastened to/unfastened from said top plate. If the support plate is the bottom plate, the lower part of the mold is rapidly fastened to/unfastened from said bottom plate. The invention may also be used both for the upper part of the mold and for the lower part of the mold so that it is possible for the entire mold to be rapidly fastened to/unfastened from the vulcanizing press.

The invention thus makes it possible to optimize the loading/unloading of a mold in a vulcanizing press.

According to one embodiment of the invention, the first movable stop has a cavity comprising a shoulder capable of coming into contact with the head of the pin; a hole, the diameter of which is defined so as to let the head of the pin pass thereinto; and a sliding zone extending between the shoulder and the hole.

The first movable stop allows the head of the pin to be locked when said stop is in the active position, while still making it possible for said head to slide in the bore when the first movable stop is in the rest position.

In one embodiment, the shoulder is offset heightwise relative to the sliding zone so as to prevent the head of the pin from moving in a direction parallel to the extension of said sliding zone when the first movable stop is in the active position.

The safety of the vulcanizing press is thus improved, while ensuring that the first movable stop is self-locked with the head of the pin when the first movable stop is in its active position. To move the first movable stop to its rest position, it is thus necessary to move the head of the pin vertically so as to bring the lower part of the head of the pin level with the sliding zone and then to move the first movable stop horizontally.

In one embodiment, the support plate comprises a resisting plate and a heating plate placed between the resisting plate and the mold, said press further including elastic means placed between the resisting plate and the heating plate in order to keep said heating plate in contact with the mold.

To be able to shift the head of the pin so as to bring the lower part of the head of the pin to the same level as the sliding zone, it is necessary to provide a clearance in the vulcanizing press. When this clearance is present between the head of the pin and the shoulder, the head of the pin is then at the same level as the sliding zone. When the head of the pin rests on the shoulder, that is to say when the pin is in its active position, the clearance is between the resisting plate and the heating plate. To maintain constant contact between the heating plate and the mold, elastic means placed between the resisting plate and the heating plate are used. This therefore ensures that the temperature of the mold is generally constant over time, even when the support plate is in its distal position. The vulcanizing time of the tire is thus optimized, since it is unnecessary at each mold closing/opening cycle to provide time to raise the temperature of the mold to the vulcanizing temperature.

In one embodiment, the sliding zone forms a ramp between the shoulder and the hole.

Thus, it is unnecessary to provide a particular clearance between the heating plate and the resisting plate. It is the slope of the sliding zone that allows the head of the pin to be locked/unlocked with respect to the shoulder.

In one embodiment, the first movable stop has two cavities.

It is thus possible to fix molds of different size to the vulcanizing press.

In one embodiment, the first movable stop comprises pivoting means about which a control rod for controlling the movement of a second movable stop can rotate.

The control rod serves to link two movable stops. It is thus possible to make the movement of these two movable stops mutually dependent, in order for the two parts of the mold to be fastened to and unfastened from the vulcanizing press.

In one embodiment, the press comprises four movable stops placed on the support plate so that each movable stop is opposite one of the other movable stops; three control rods, the control rods connecting the movable stops pairwise; and an actuator connected by linking means to one of said stops in order to control the movement of the various movable stops.

The coordinated movement of the various movable stops, for fastening several mold parts to the vulcanizing press and for unfastening them therefrom, can thus be easily controlled.

The vulcanising press containing plates and other features as disclosed herein thus makes it possible to optimize the time for changing a mold on a vulcanizing press.

Also disclosed herein is a system for manufacturing a tire comprising a vulcanizing press in accordance with the vulcanizing press described above, a mold placed between the plates of the vulcanizing press and at least one pin intended to fix the mold to the vulcanizing press.

BRIEF DESCRIPTION OF THE DRAWINGS

Other features and advantages of the invention will become apparent from the following description given by way of example but implying no limiting character, in conjunction with the appended drawings in which.

DETAILED DESCRIPTION OF SPECIFIC EMBODIMENTS

In the present description, the embodiments are described in conjunction with the use of molds of the sectorized type. However, it should straightaway be noted that the invention is not limited to the use of this type of mold but extends to other types of molds, such as two-part molds, called "shell molds".

In the following description, substantially identical or similar elements will be denoted by the same references.

Figure 1:
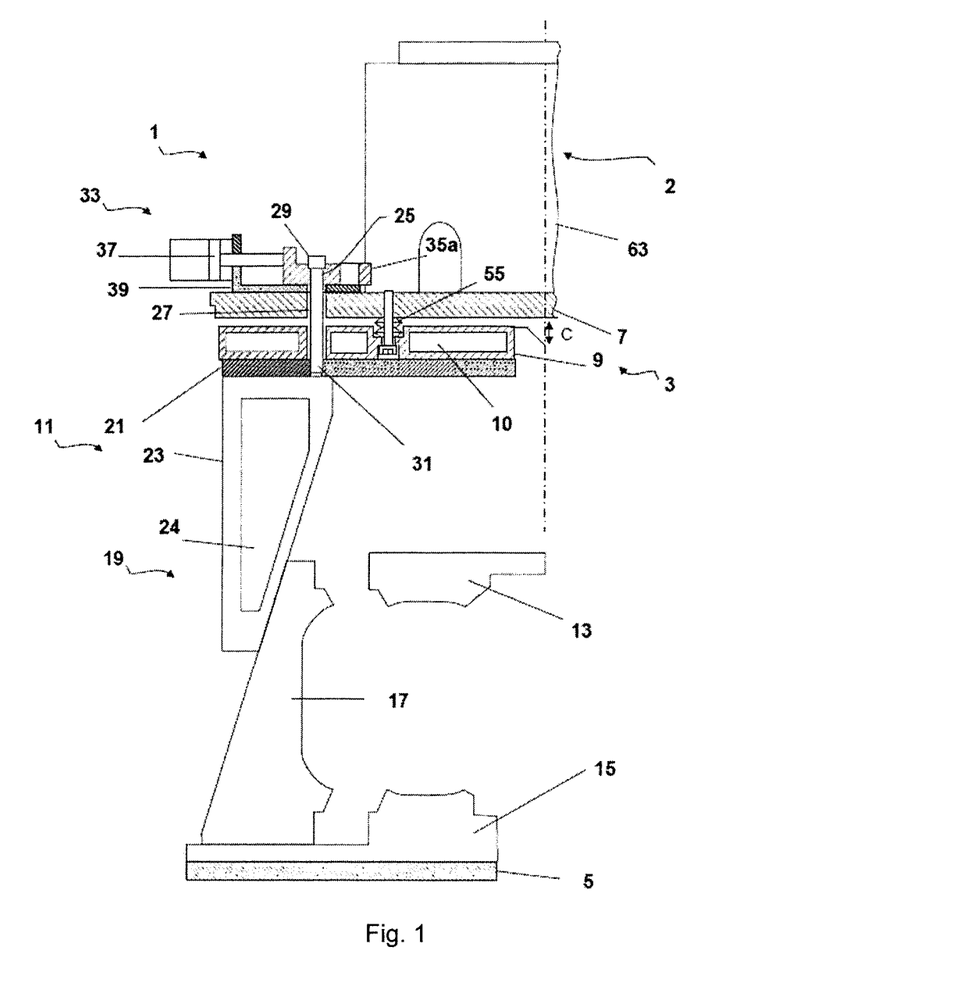
FIG. 1 shows a partial sectional view of a vulcanizing press according to an embodiment of the invention for manufacturing tires.

FIG. 1 shows a partial sectional view of a system 1 for manufacturing tires. The system 1 comprises a vulcanizing press 2 having a top plate 3 and a bottom plate 5. Here, the bottom plate 5 is fixed and the top plate 3 can move vertically. As a variant, it is possible for the top plate 3 to be fixed and the bottom plate to move vertically. All combinations of movement between the top plate and the bottom plate are possible.

The system 1 also comprises a mold 11. The mold 11 is placed between the top plate 3 and the bottom plate 5. Here, the mold 11 is divided into a plurality of mold parts 13, 15, 17, 19. In particular, the mold 11 comprises upper shells 13 and lower shells 15. The mold 11 also comprises a plurality of sectors 17 capable of coming into contact with the upper shells 13 and lower shells 15. The mold also comprises rings 19 designed to move the sectors 17 towards the upper shells 13 and lower shells 15. The rings 19 are placed around sectors 17 and comprise a baseplate 21 and an upright 23 placed transversely with respect to the baseplate 21. In cross section, the overall shape of the upright 23 is approximately triangular. To make the embodiment more easily understood, FIG. 1 shows only a single upper shell 13, a single lower shell 15, a single sector 17 and a single ring 19.

The embodiment applies here to the fastening of the ring 19 to the top plate 3, called in the rest of the description the support plate 3.

Of course, other embodiments may apply to fastening the lower shell 15 to the bottom plate 5, the bottom plate 5 then being a support plate.

Here, the support plate 3 supports the ring 19 of the mold 11. Here, it should be noted from now on that the upper shell 13 is supported here by a ram (not shown) belonging to the vulcanizing press 2.

The support plate 3 moves between a proximal position with respect to the bottom plate 5 and a distal position with respect to said bottom plate 5.

In the distal position as shown in FIG. 1, the various mold parts 13, 15, 17, 19 are sufficiently far apart to be able to insert a tire to be vulcanized. Likewise, in this distal position, the various mold parts 13, 15, 17, 19 are sufficiently spaced apart to be able to remove a vulcanized tire.

In the proximal position, the upper shells 13, the lower shells 15 and the plurality of sectors 17 form a housing intended to enclose a tire in order to to vulcanize it.

Vulcanization is a manufacturing step that consists in changing the rubber of the tire from a plastic state to an elastic state. During this step, it is possible to form the pattern on the tire (grooves, incisions, etc.). To do this, the sectors 17 have on the inside particular molding elements (not shown).

It should be noted that the support plate 3 and the upright 23 have internal spaces 10, 24 for the flow of a fluid heated to very high temperature, such as steam, for the purpose of heating the upper shell 13, the lower shell 15 and the sector 17.

The system 1 for manufacturing tires also includes at least one pin 25 placed in a bore 27 formed in the support plate 3. The pin 25 comprises a head 29 and a shank 31 opposite the head. The shank 31 of the pin 25 is fixed here to the baseplate 21 of the ring 19. The diameter of the bore 27 is defined so as to allow the head of the pin 25 to pass thereinto.

The vulcanizing press 2 includes a locking/unlocking device 33 comprising a first movable stop 35a that can move between a rest position and an active position. In FIG. 1, the first movable stop 35a is in the active position. In this active position, the first stop 35a is interposed between the head 29 of the pin 25 and the support plate 3 so as to keep the pin 25 in the bore 27.

The first movable stop 35a is linked to an actuator 37 capable of moving said movable stop 35a. More particularly, the first movable stop 35a here can slide on a retaining plate 39 connected to the frame of the actuator 37.

It should be noted that the support plate 3 comprises a resisting plate 7 and a heating plate 9.

The resisting plate 7 is that part of the support plate 3 which is connected to a ram 63 for moving said support plate 3 vertically.

The heating plate 9 includes internal spaces 10 for the flow of the fluid heated to very high temperature.

There is a clearance C between the resisting plate 7 and the heating plate 9 when the support plate 3 is in the distal position shown in FIG. 1.

When the support plate 3 is in its proximal position, the clearance C between the resisting plate 7 and the support plate 3 disappears. This clearance C is between the head 29 of the pin 25 and the shoulder 49, thereby enabling the first movable stop 35a to move towards its rest position.

It should also be noted in FIG. 1 that there are elastic means 55, which is a biasing element, desirably of the compression spring type, between the resisting plate 7 and the heating plate 9. These elastic means 55 enable the heating plate 9 to be kept in contact with the baseplate 21 of the ring 19 while still maintaining a certain distance between the heating plate 9 and the resisting plate 7 when the support plate is in the distal position. Thus, the heat transfer between the heating plate 9 and the baseplate 21 is improved and heat loss between the heating plate 9 and the resisting plate 7 is avoided.

Likewise, the elastic means enable the heating plate 9 to be brought back into contact with the baseplate 21 when the support plate 3 leaves the proximal position since in this instant it may happen that the heating plate 9 jams between the resisting plate 7 and the baseplate 21 owing to the effect of the movement of the support plate 3. It is therefore necessary to provide these elastic means 55 for bringing the heating plate 9 back against the baseplate 21.

Figure 2:
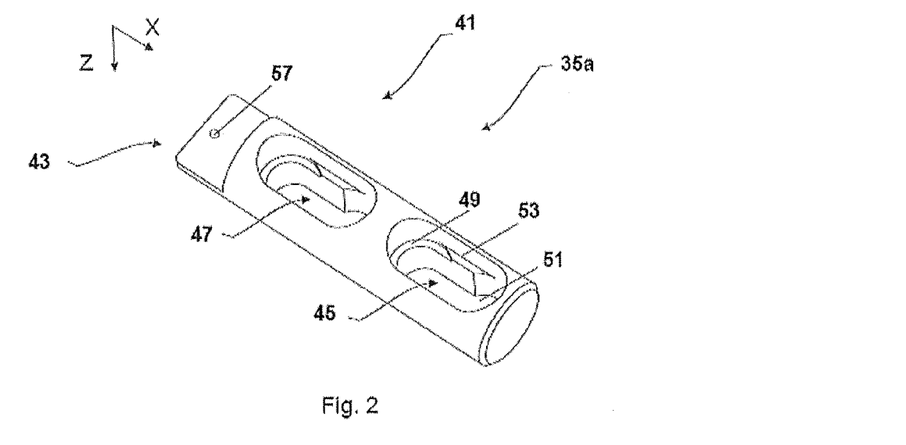
FIG. 2 shows a perspective view of a first example of a first movable stop belonging to the vulcanizing press of FIG. 1.

FIG. 2 shows a perspective view of a first example of a first movable stop 35a. Here, the first movable stop 35a comprises a cylindrical part 41 and a flat 43 in one piece with the cylindrical part 41.

The part 41 has a first cavity 45 and a second cavity 47 identical to the first cavity 45. The second cavity 47 is away from the first cavity 45 in the length direction of the first movable stop 35a, i.e. in a horizontal direction X. The locking/unlocking device 33 can thus adapt to various sizes of the mold 11.

Each cavity has a shoulder 49 designed to come into contact with the head 29 of the pin 25, a hole 51 and a sliding zone 53 extending between the shoulder 49 and the hole 51.

The hole 51 has a defined diameter so as to let the head 29 of the pin 25 pass thereinto.

The sliding zone 53 is a smooth surface so as to make it easy for the head 29 of the pin 25 to slide when the first movable stop 35a moves from the active position to the rest position.

To keep the pin 25 in the bore 27 when the first movable stop 35 is in the active position, provision is made for the sliding zone 53 to extend along the horizontal direction X and for the shoulder 49 to be offset heightwise, that is to say offset in a vertical direction Z relative to the sliding zone 53. The head 29 of the pin 25 is thus prevented from moving in the horizontal direction X. The safety of the manufacturing system 1 is therefore improved by ensuring that the first stop 35a is self-locked with the head 29 of the pin 25 when the first movable stop 35a is in its active position.

To move the first movable stop 35a to its rest position, the head 29 of the pin 25 must be shifted upwards relative to the shoulder 49 so as to bring the lower part of the head 29 to the same level as the sliding zone 53. When the lower part of the head 29 reaches this level, the actuator 37 can move the first movable stop 35a to its rest position. This upward shift of the head 29 of the pin 25 is possible when the support plate 3 is in its proximal position because of the absence of the clearance C between the resisting plate 7 and the heating plate 9 and the presence of said clearance C between the head of the pin 25 and the shoulder 49.

Figure 3:
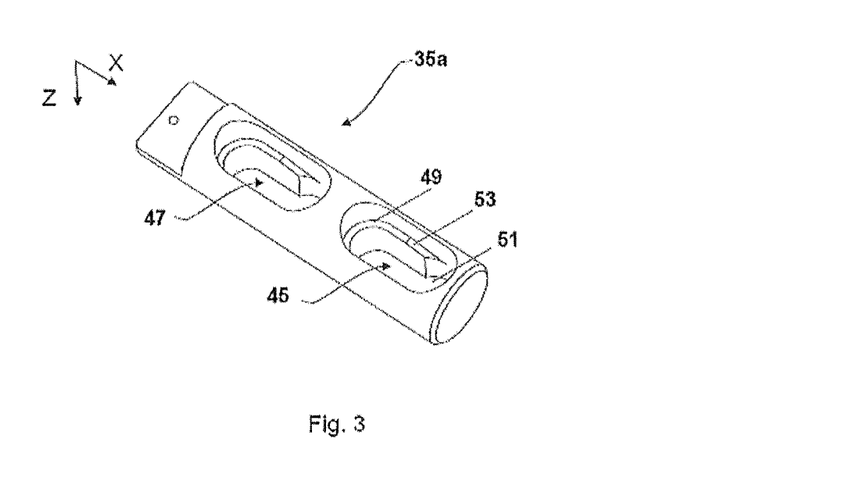
FIG. 3 shows a perspective view of a second example of a first movable stop belonging to the vulcanizing press of FIG. 1.

FIG. 3 shows another embodiment of the first movable stop 35a. In this embodiment, the sliding zone 53 forms a ramp between the shoulder 49 and the hole 51. It is then unnecessary to provide a particular clearance between the resisting plate 7 and the support plate 3, since it is the slope of the ramp that makes it possible for the head 29 of the pin 25 to be blocked against the first movable stop 35a at the shoulder 49.

Of course, the invention is not limited to these two particular embodiments of the first movable stop 35a, rather it encompasses all equivalent embodiments.

For example, the first movable stop 35a may be provided in the form of a fork having two arms. The two arms are spaced apart by a distance smaller than the diameter of the head of the pin. In the active position of the first movable stop 35a, the arms are interposed between the head 29 of the pin 35 and the support plate 3 so as to keep said pin 25 in the bore 27. In the rest position of the first movable stop 35a, the arms are offset relative to the head 29 of the pin 25.

In another example, the first movable stop may be designed to undergo a rotational movement so as to pass from an active position to a rest position, instead of a translational movement as in the previous examples. The first movable stop may then be in the form of a cam that can be interposed between the head 29 of the pin 25 and the support plate 3 in the active position, following a rotation from the rest position.

FIG. 2 shows, on the flat 43, pivot means 57 about which a control rod can rotate.

Figure 4A:
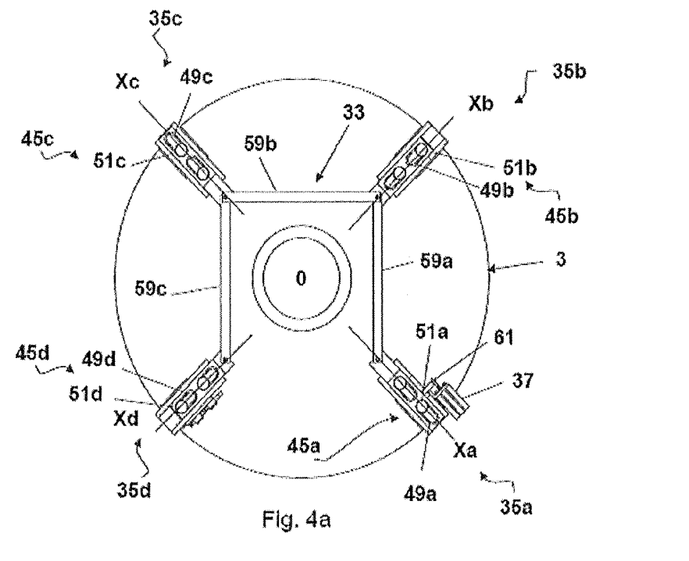
FIGS. 4a and 4b show top views of the vulcanizing press of FIG. 1 in two different positions of a set of control rods for controlling the movable stops.
Figure 4B:
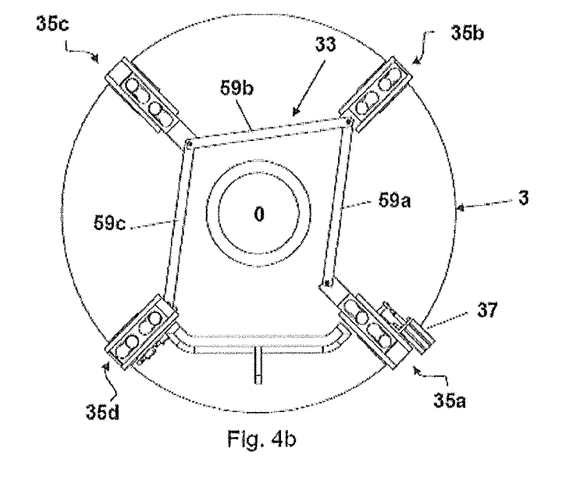

FIGS. 4a and 4b show in greater detail the operation of such a control rod.

More particularly, FIGS. 4a and 4b show a locking/unlocking device 33 comprising four movable stops 35a, 35b, 35c and 35d extending along axes Xa, Xb, Xc and Xd on the support plate 3. In the illustrated embodiment, the support plate takes the form of a disk and the movable stops 35a, 35b, 35c and 35d are placed on the support plate 3 so that the axes Xa, Xb, Xc and Xd intersect at the center O of the support plate 3. In the illustrated embodiment, each movable stop is placed opposite another movable stop.

The locking device 33 also includes three control rods 59a, 59b and 59c. Each control rod links two movable stops so that the first control rod 59a links the first movable rod 35a to a second movable stop 35b, the second control rod 59b links the second movable stop 35b to a third movable stop 35c, and the third control rod 59c links the third movable stop 35c to a fourth movable stop 35d.

The first movable stop 35a is linked to the actuator 37 by linking means or linkage 61.

It should be noted that in the illustrated embodiment there are two types of movable stop. The first movable stop 35a and the third movable stop 35c in which the holes 51a and 51c are closer to the center O than the shoulders 49a and 49c, belong to a first type. The second movable stop 35b and the fourth movable stop 35d, in which the holes 51b and 51d are further away from the center O than the shoulders 49b and 49d, belong to a second type.

In FIG. 4a, the various movable stops 35a, 35b, 35c and 35d are all in their rest positions.

In FIG. 4b, the various movable stops 35a, 35b, 35c and 35d are all in their active positions. The movement from the rest positions to the active positions is accomplished by means of the actuator 37. Specifically, when the actuator 37 moves the first movable stop 35a from the position shown in FIG. 4a to the position shown in FIG. 4b, the first movable stop 35a is directed towards the center O of the support plate 3. The rod 59a drives the second movable stop 35b away from the center O. The rod 59b then drives the third movable stop 35c towards the center O and the rod 59c drives the fourth movable stop 35d away from the center O.

By virtue of the locking/unlocking device 33 shown in FIGS. 4a and 4b, it is possible to move the various movable stops 35a, 35b, 35c and 35d using a single actuator 37.

We will now present with greater detail, using FIGS. 5a, 5b, 5c and 5d, one method of removing a mold.

Figure 5:
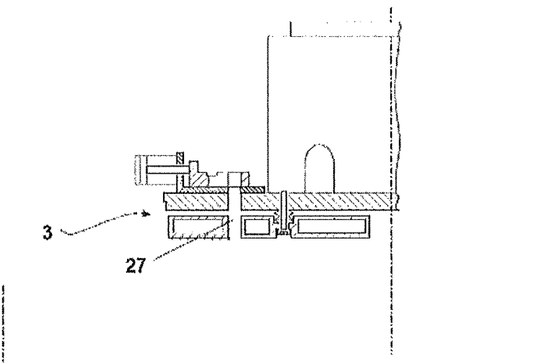
FIGS. 5a, 5b, 5c and 5d show various steps of a method of removing a mold from the vulcanizing press of FIG. 1.
Figure 5A:
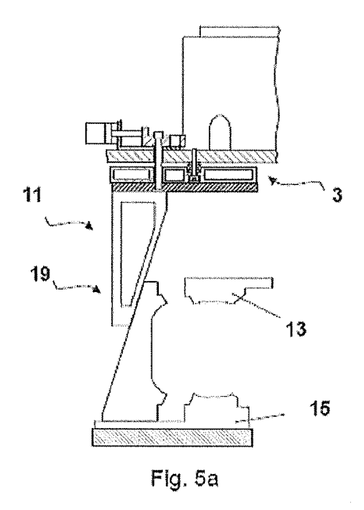

FIG. 5a shows the support plate 3 in the distal position of FIG. 1. The ring 19, the upper shell 13 and the lower shell 15 are spaced apart. In this position, the mold is "open".

Figure 5B:
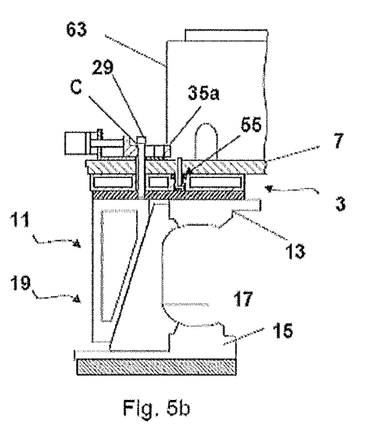

FIG. 5b shows the support plate 3 in its proximal position. The sector 17 is in contact with the upper shell 13 and the lower shell 15. In this position, the mold 11 is "closed".

To move from the position shown in FIG. 5a to the position shown in FIG. 5b, the ram 63 acts on the resisting plate 7 so as to move the ring 19 towards the lower shell 15. The upper shell 13 is moved coordinately towards the lower shell 15 by another ram (not shown). The ring 19 is designed so that its vertical movement towards the lower shell 15 causes the sector 17 to move horizontally towards the upper shell 13 and the lower shell 15.

It should be noted that in the configuration shown in FIG. 5b, the elastic means 55 are compressed and the clearance C is between the head 29 of the pin and the first movable stop 35a.

Figure 5C:
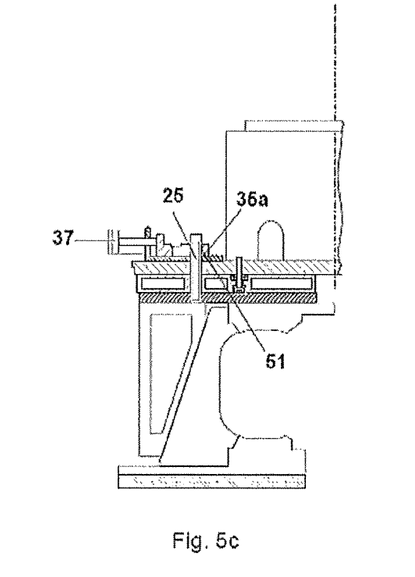

In FIG. 5c, the first movable stop 35a is in its rest position after a movement of the actuator 37. In this rest position, the pin 25 is in the hole 51 of the first movable stop 35a.

Figure 5D:
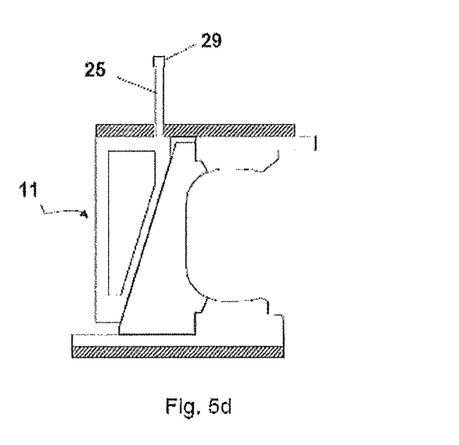

FIG. 5d shows a position in which the support plate 3 is back in its distal position. The support plate 3 is then disconnected from the mold 11 since the head 29 of the pin 25 has not been retained in the bore 27. It is then possible to remove the mold from the vulcanizing press from the position shown in FIG. 5d.

Also disclosed herein is a method of mounting a mold on the vulcanizing press. This method includes a step of loading the mold on the bottom plate so as to position heads of pins relative to bores formed in the support plate. The mounting method also includes a step of moving the support plate towards the proximal position so as to make the heads of the pins penetrate into the respective bores. In the proximal position, the movable stops are moved towards their active position so as to lock the heads of the pins and fix the mold to the vulcanizing press.

The invention having been described according to certain specific embodiments, it will be understood that these embodiments are illustrative and do not limit the scope of the appended claims.

The invention claimed is:

1. Vulcanizing press comprising:
   two plates capable of adopting a proximal position in which said plates close a mold, so as to give a tire a predetermined shape, and a distal position in which the mold is open; and
   at least one bore formed in one of said plates called the support plate, the diameter of said bore being defined so as to let the head of a pin pass into and through said bore,
   a locking/unlocking device comprising a first movable stop that can move between a rest position and an active position, in which said first stop is interposed between the head of the pin and the support plate in order to keep said pin in the bore, the shank of said pin being fixed to the mold,
   wherein the support plate comprises a resisting plate a heating plate placed between the resisting plate and the mold, and elastic means or biasing element placed between the resisting plate and the heating plate in order to keep said heating plate in contact with the mold.

2. Press according to claim 1, wherein the first movable stop comprises a cavity comprising:
   a shoulder capable of coming into contact with the head of the pin;
   a hole, the diameter of which is defined so as to let the head of the pin pass into and through the hole; and
   a sliding zone extending between the shoulder and the hole.

3. Press according to claim 2, in which the shoulder is offset heightwise relative to the sliding zone so as to prevent the head of the pin from moving in a direction parallel to the extension of said sliding zone when the first movable stop is in the active position.

4. Press according to claim 1, in which the first movable stop has two cavities.

5. Press according to claim 1, in which the first movable stop comprises pivoting means about which a control rod for controlling the movement of a second movable stop can rotate.

6. Press according to claim 1, comprising:
   four movable stops placed on the support plate so that each movable stop is opposite one of the other movable stops;
   three control rods, wherein each of the control rods connects a pair of adjacent movable stops; and
   an actuator connected by a linkage to one of said movable stops in order to control the movement of the various movable stops.

7. System for manufacturing a tire, comprising:
   a vulcanizing press according to claim 1;
   a mold placed between the plates of the vulcanizing press; and
   at least one pin adapted to fix the mold to the vulcanizing press.

* * * * *